United States Patent [19]
Eriksson et al.

[11] 3,877,902
[45] Apr. 15, 1975

[54] FLOOR SURFACE TREATING APPARATUS

[75] Inventors: Bolik Anders Gottfrid Eriksson, Johanneshov; Milos Vukotic, Tumba, both of Sweden

[73] Assignee: Aktiebolaget Electrolux, Stockholm, Sweden

[22] Filed: Nov. 29, 1973

[21] Appl. No.: 420,206

[30] Foreign Application Priority Data
Apr. 27, 1973 Sweden .................. 7305999

[52] U.S. Cl. ............ 55/337; 55/357; 55/424; 55/467; 55/DIG. 3
[51] Int. Cl. ............................................. B01d 50/00
[58] Field of Search ........... 55/337, 356, 357, 383, 55/410, 413, 459, 471, DIG. 3, DIG. 8, 472, 318, 319, 320, 332, 424, 425, 426, 429, 430, 432, 433, 449, 414, 467, DIG. 25, 315, 321, 323, 325; 15/353; 116/109, 114 AD, 118

[56] References Cited
UNITED STATES PATENTS

| | | | |
|---|---|---|---|
| 2,233,167 | 2/1941 | Holm-Hansen | 55/459 |
| 2,534,808 | 11/1950 | Bevington, Jr. et al. | 15/353 |
| 3,034,273 | 5/1962 | Wallace | 55/467 |
| 3,046,718 | 7/1962 | Ide et al. | 55/276 |
| 3,063,082 | 11/1962 | Rosenberg et al. | 55/356 |
| 3,308,609 | 3/1967 | McCulloch et al. | 55/337 |
| 3,320,727 | 5/1967 | Farley et al. | 55/356 |
| 3,594,991 | 7/1971 | Berz | 55/337 |
| 3,633,341 | 1/1972 | Langbis | 55/467 |

*Primary Examiner*—Frank W. Lutter
*Assistant Examiner*—David L. Lacey

[57] ABSTRACT

A floor surface treating device having a container with a motor fan unit and a cyclone separator on one side thereof and a filter on the other side thereof. The container is provided with an inlet for the reception of dust-laden air or liquid. The inlet opening to the motor fan unit for the air flowing from the air outlet of the cyclone separator is in the form of a channel extending downwardly and toward the interior of the container whereby the liquid which may be entrained with the air can be removed from the air stream before it enters the motor fan unit. A tilting device for the container is provided and an arrangement for the inlet tubular piece is supplied for latching a suction conduit thereto.

3 Claims, 5 Drawing Figures

FLOOR SURFACE TREATING APPARATUS

In prior constructions of floor treating devices which handled both liquid and dust, there was the problem of entrainment of some liquid particles in the container with the air flowing through the air outlet of the separator, the filter, and into the inlet opening of the motor fan unit. Obviously, liquid in the motor has the capability of causing damage to the mechanism.

The present invention relates to a floor surface treatment apparatus for dust-laden air or liquid in which provision is made to prevent liquid from entering the motor fan unit. In addition, the container for the apparatus is provided with a tilting device and an arrangement is provided for latching a suction conduit to the inlet of the apparatus.

An object of the present invention is to provide a conduit structure in a floor treating apparatus for ensuring that liquid droplets entrained with the flowing air do not reach the inlet of the motor fan unit.

A further object of the present invention is to provide a structure secured to an exterior surface of the container for aiding in the tilting of the container in order to spill its contents.

Another object of the present invention is to provide a latching mechanism for the tubular inlet of the container whereby the suction hose can be removably attached thereto.

The invention will now be more fully described with reference to the accompanying drawings in which.

DESCRIPTION OF THE PREFERRED EMBODIMENTS

Figure 2:
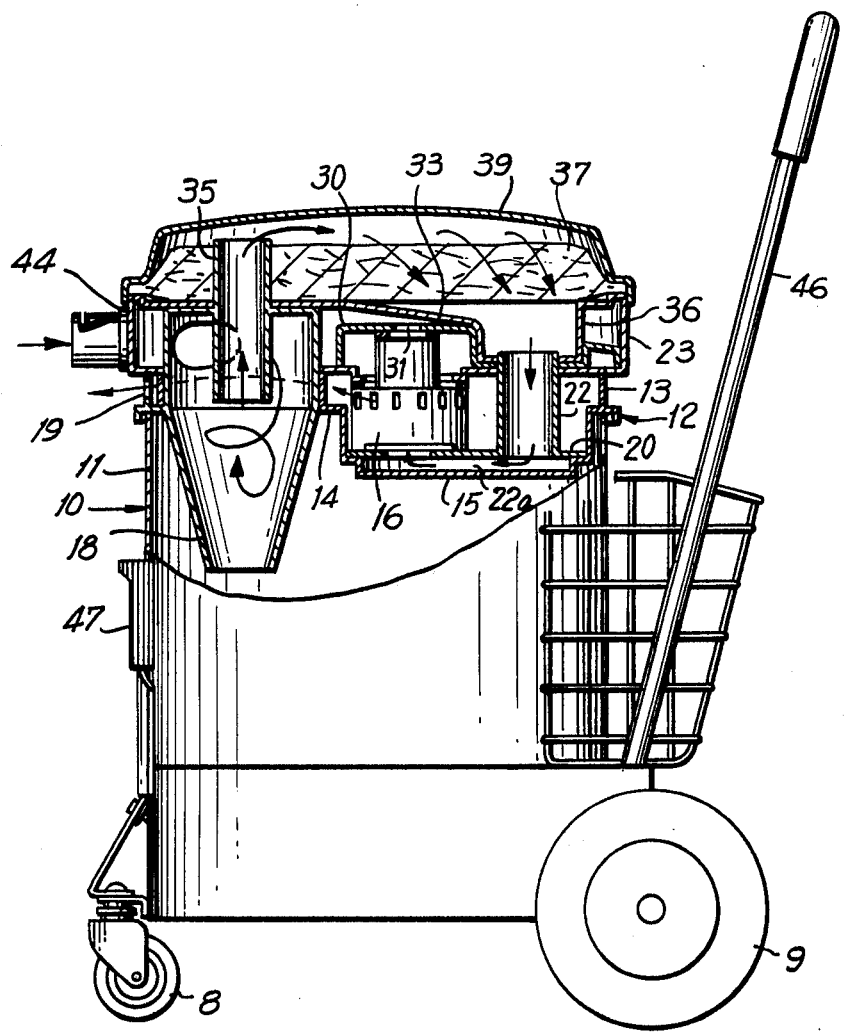
FIG. 2 is a part sectional and a part elevational view of the apparatus.

As seen in FIG. 2, the floor surface treating apparatus is referred to generally by the numeral 10 and is shown having a generally cylindrical container 11 supported on a carriage having a forward wheel 8 and rear wheels 9 for movement of the apparatus over the work surface.

Figure 1:
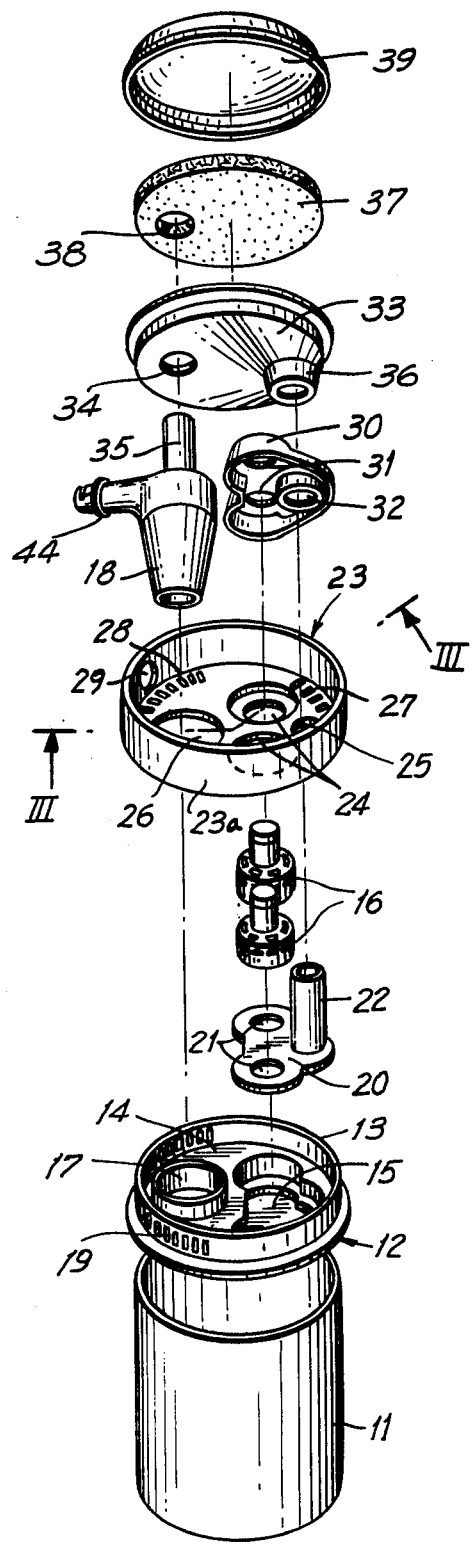
FIG. 1 is an exploded view of the principal components of the floor surface treating apparatus constructed in accordance with the teachings of the present invention.

As seen in the bottom of FIG. 1, a frame structure is illustrated for mounting on the upper edge of the container 11. The frame structure is provided with an upstanding annular part 13 and a bottom section 14. The latter has a recessed portion 15 in which a double motor fan unit 16 is accommodated. The bottom section 14 is further provided with a flanged opening 17 in which the cyclone separator 18 is mounted. The annular part 13 is provided with a series of openings 19 for the passage of air exiting to the atmosphere. A plate 20 rests in the recessed portion 15 of the frame 12 and the motor fan units 16 are supported thereon. The plate 20 is further provided with inlet openings 21 and an upstanding pipe 22 which is generally vertical to the plate 20.

A cylindrical casing 23 is supported on the frame 12 and has a diameter slightly larger than the diameter of the frame. The bottom of casing 23 has two spaced openings 24 for receiving the motor fan units 16 and an opening 25 for the pipe 22 and a further relatively large opening 26 for the upper part of the cyclone separator 18. In a part of the bottom sector of the casing 23, a multiplicity of slot-shaped openings 27 is provided for the flow of cooling air to the motor fan units 16, and located diametrically opposite to the openings 27 is a plurality of openings 28 through which the cooling air is discharged. Another opening 29 is provided in the upstanding wall 23a of the casing 23.

As seen in FIG. 1, the casing 30 is provided with two openings 31 through which the cooling air is discharged from the motor fan units 16. The pipe 22 projects through the opening 32 in the casing 30. It should be apparent that the casing 30 houses both of the motor fan units 16 and forms paths for the cooling air.

A funnel-shaped part 33 is seen in FIG. 1 which rests in the casing 23. The funnel has an opening 34 for the upwardly extending conduit 35 of the cyclone separator 18. The conduit 35 functions as the air outlet of the cyclone separator. The funnel-shaped part 33 is further provided with a downwardly extending tubular piece 36 that is connected to the pipe 22. Located on the top of the part 33 and supported thereby is a flat, disc-shaped filter 37 having a hole 38 through which the conduit 35 passes. A cover 39 encloses the filter at a distance from the upper surface thereof and is maintained on the peripheral edge of the funnel 33.

Figure 3:
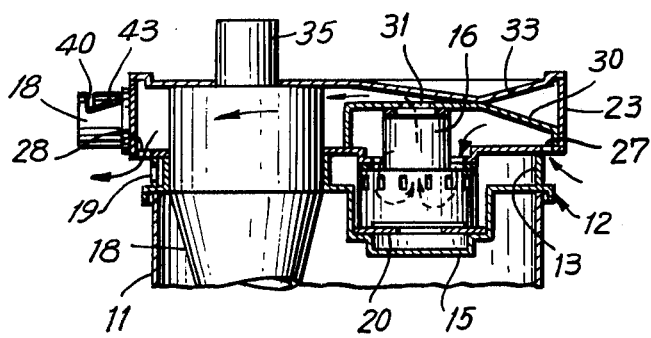
FIG. 3 is a sectional view taken along the lines III—III of FIG. 1 with all the elements shown in that figure including the motor fan unit and the cyclone separator but with the exception of the filter and cover.
Figure 4:
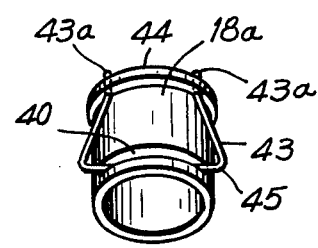
FIG. 4 is a perspective view showing the suction hose connection to the inlet of the apparatus.
Figure 4:
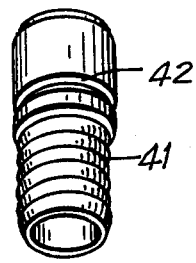

Referring to FIGS. 1, 3, and 4, the inlet tubular piece 18a for the cyclone separator 18 is shown provided with a transverse slot 40 and an annular flange 44. A latching part is formed by a U-shaped yieldable bracket 43 having a web portion 45. The legs 43a of the bracket 43 are clamped by the flange 44 to the tubular piece 18a. A suction hose 41 of the well-known type may be removably connected to the inlet tubular piece 18a by means of the movable bracket 43 in which the web portion 45 thereof is moved into the transverse slot 40 and is seated in transverse groove 42 in the suction hose 41. This construction permits a simple and quick coupling of the hose to the floor treating apparatus, allowing the hose to rotate about its longitudinal axis during use of the present floor surface treating apparatus.

Figure 5:
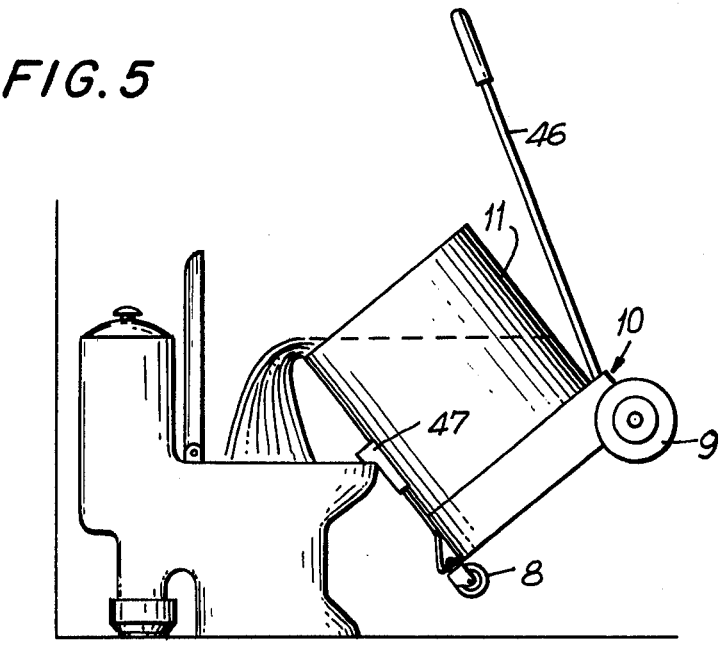
FIG. 5 is an elevational view showing a tilting device mounted on the container which permits the latter to engage a structure, such as a toilet bowl, in order to tilt the apparatus to the desired degree.

The container 11 for the apparatus is provided with an operating handle 46. The outer surface of the container is further provided with a projecting, generally angular, part 47 on the side of the container opposite to the handle 46. The part 47 is located a predetermined distance from the bottom of the container and is so constructed that it can bear against a marginal edge of an object, such as a toilet bowl, upon which the apparatus can be tilted in order to empty the contents of the container 11 (FIG. 5).

The operation of the floor surface treating apparatus is as follows: Air laden with dust or liquid is drawn by suction through the suction conduit 41, the inlet tubular piece 18a, and into the cyclone separator 18. Large dust particles and liquid are separated in the separator 18 due to the cyclone effect and consequently fall through the outlet of the separator to the bottom of the container. Partially cleaned air is transported through the air outlet of the separator 18 and through the conduit 35 to the area in the container 11 about the filter 37. As seen in FIG. 2, the partially cleaned air flows through the filter 37 and further separates the dust from the air stream passing therethrough. The air is then conveyed downwardly through the pipe 22 and the space 22a between the plate 20 and the portion 15 of the frame structure 12. The air is conducted to the inlet openings of the motor fan units 16 and is discharged to the atmosphere through their outlet openings and the openings 19 in the annular part 13 of the frame structure 12.

The motor fan units 16 are cooled by means of cooling air passing through the openings 27 in the bottom of the casing 23 and passing through the two motors in order to cool the same, the upper parts of which seal against the inner surface of the upper part of the motor housing 30, as seen in FIG. 3. The cooling air in the motor fan units is blown out through the openings 31 in the motor housing 30 which are positioned within the casing 23 and exits from the casing 23 through the openings 28 in the bottom sector of the casing 23.

What is claimed is:

1. A floor surface treating apparatus comprising a container having an upper part provided with an inlet opening for dust-laden air or liquid, a discharge opening for clean air, a lower part for collecting separated dust or separated liquid, a generally vertically disposed cyclone separation in said container operatively connected to said inlet opening, at least one motor-fan unit in said container for moving air through said container, a filter in said container, means mounting said filter above said separator and said motor-fan unit, said separator having an outlet, and a conduit system means including pipe means extending through said filter for transporting air from the separator through said outlet and said pipe means and through said filter to the inlet opening of said motor-fan unit and subsequently to said discharge opening for clean air, and conduit system means further constituting a passageway located between said filter and said inlet opening to the motor-fan unit, said passageway having a laterally extending portion located below said motor-fan and in which liquid is collected and substantially all the air passing through said filter moves therethrough and changes direction of movement to pass through said motor-fan unit.

2. A floor surface treating apparatus as set forth in claim 1 wherein said passageway includes a portion in the form of a pipe positioned under said filter and being arranged generally parallel to said pipe means.

3. A floor surface treating apparatus as set forth in claim 2 wherein said pipe is provided with a plate at the bottom end thereof, said plate being the ceiling of said laterally extending portion of the passageway.

* * * * *